US007123647B1

(12) United States Patent  
Sheng

(10) Patent No.: US 7,123,647 B1  
(45) Date of Patent: Oct. 17, 2006

(54) CHIP RATE BASE BAND RECEIVER PROCESSOR WHICH RECEIVES DIGITAL INFORMATION CONTAINING SYMBOL INFORMATION

(75) Inventor: Chengke Sheng, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/438,288

(22) Filed: Nov. 12, 1999

(51) Int. Cl.
*H04B 1/69* (2006.01)

(52) U.S. Cl. .................................... 375/150

(58) Field of Classification Search ............ 375/150, 375/130, 134, 137, 142, 147, 141, 140, 316, 375/343, 340; 370/310, 315, 316, 319, 320, 370/321, 337, 336, 329, 328, 343, 344, 347, 370/345; 455/130
See application file for complete search history.

(56) References Cited

U.S. PATENT DOCUMENTS

| | | | | |
|---|---|---|---|---|
| 4,599,732 A | * | 7/1986 | LeFever | 375/346 |
| 5,103,459 A | * | 4/1992 | Gilhousen et al. | 370/206 |
| 5,960,028 A | * | 9/1999 | Okamoto et al. | 375/130 |
| 6,154,487 A | * | 11/2000 | Murai et al. | 375/150 |

* cited by examiner

*Primary Examiner*—Pankaj Kumar
(74) *Attorney, Agent, or Firm*—James L. Clingan, Jr.

(57) ABSTRACT

An X-Y, base-band receiver for code-division multiple accessing ("CDMA") is used at both base station and mobile station. The signal transmitted from a transmitter carries serial information symbols. Signals from all transmitters pass through a multi-path fading channel before they are received by the X-Y receiver. There is more than one instance of each symbol. The X-Y receiver searches for all instances of each symbol and combines all instances.

3 Claims, 5 Drawing Sheets

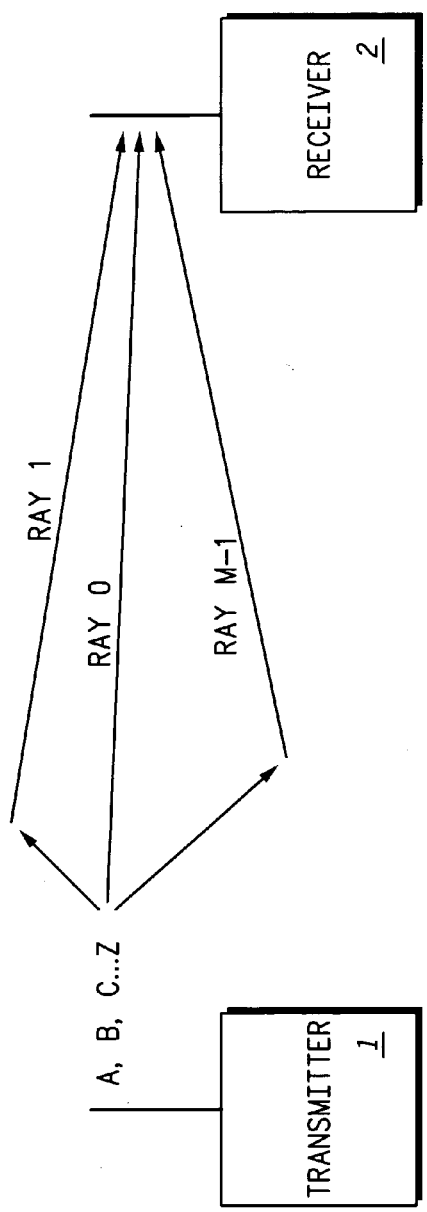
*FIG.1* –PRIOR ART–
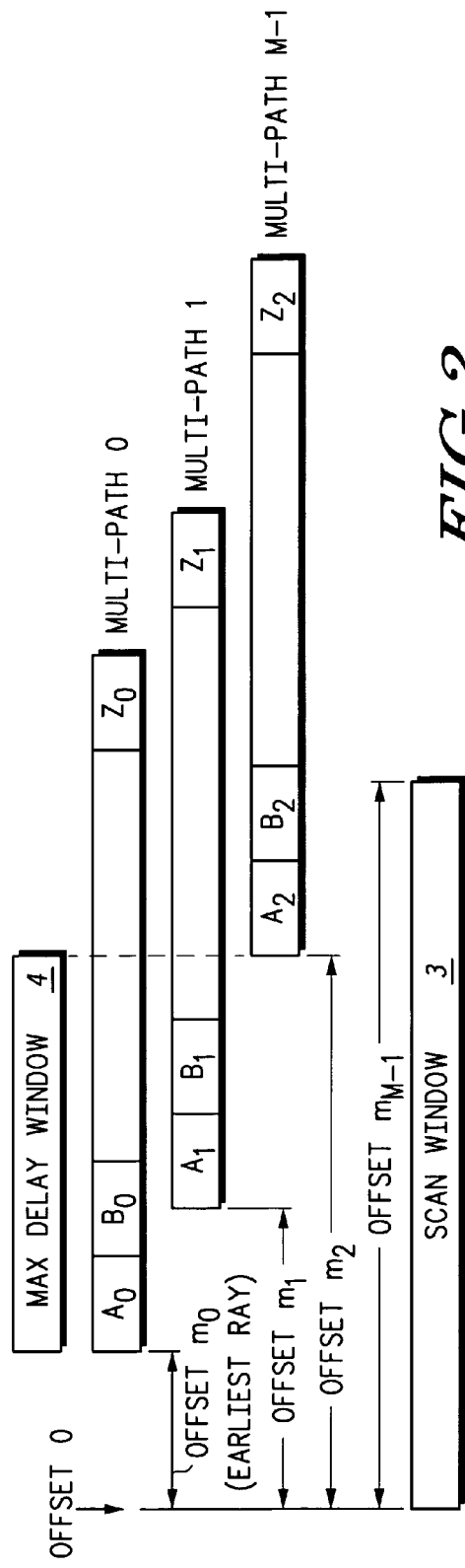
*FIG.2*

CHIP RATE BASE BAND RECEIVER PROCESSOR WHICH RECEIVES DIGITAL INFORMATION CONTAINING SYMBOL INFORMATION

FIELD OF THE INVENTION

This invention relates generally to the field of receivers of radio frequency transmissions. More particularly, this invention relates to a new receiver for code division multiple access ("CDMA") communication systems.

RELATED ART

Prior art communication systems have incorporated such compression techniques as frequency division multiple access ("FDMA") and time division multiple access ("TDMA"). FDMA is a multiple-access technique based on assigning each user a unique frequency band upon which transmission takes place. With TDMA, the available communication resource is divided into a number of distinct time segments, each of which can then be used for transmission by individual users.

CDMA, on the other hand, is based on spread-spectrum techniques where all users share all the channel resources. Multiple users are distinguished by assigning unique identification codes ("Pn codes") specific to each signal. Each user may transmit multiple signals (e.g., voice, data, video, etc.). Individual detection is accomplished at the receiver through correlation of the Pn codes to the particular signal.

A traditional way to separate the various signals received from different transmitters using CDMA is called a "rake receiver." A rake receiver includes a searcher and a plurality of fingers. The searcher examines the signal, and determines the number of rays, or multi-paths, for each Pn code and the offset of each path. A particular Pn code commonly has a plurality of multi-paths due to reflections against buildings, terrain such as mountains, or other obstacles. A finger of the rake receiver is assigned to each specific multi-path, assuming the rake receiver has enough fingers. For example, if three multi-paths are detected, the first finger ($F_0$) is provided the p-offset for that multi-path. In the same way, $F_1$ is set to the second multi-path, and further fingers are assigned until the number of multi-paths or the number of fingers is exhausted, up to $F_{n-1}$. The rake receiver then includes an accumulator which adds the signal component from each finger tracking a multi-path for that signal.

While reasonably effective, the rake receiver suffers from several disadvantages. First, to maximize the signal to noise ratio, the number of fingers should be at least equal to the number of multi-paths detected. Any additional fingers, however, increase hardware costs and the likelihood that fingers will be wasted. Conversely, if there are too few fingers, the signal to noise ratio of the receiver system is decreased.

It should also be noted that the rake receiver requires a searcher to identify all multi-paths with the desired Pn code. In addition, the p-offset associated with a particular multi-path is subject to variance, so the searcher must scan for changes in the multi-path during the entire transmission. Changes in the Pn code associated with each multi-path are due to a number of factors, including changes in the position of the transmitter, which is often mobile, as well as variances in the terrain and other obstacles in which the signals are reflected and transmitted.

BRIEF DESCRIPTION OF THE DRAWINGS

The present invention is illustrated by way of example, and not by way of limitation, in the figures of the accompanying drawings and in which like reference numerals refer to like elements and in which:

FIG. 1 illustrates a simple schematic of a prior art transmitter/receiver pair showing multiple rays traversing distinct multi-paths to reach the receiver.

FIG. 2 illustrates, in block format, the multi-path delay and scan range functionality of the X-Y receiver in accordance with the present invention.

DESCRIPTION OF A PREFERRED EMBODIMENT

Figure 3:
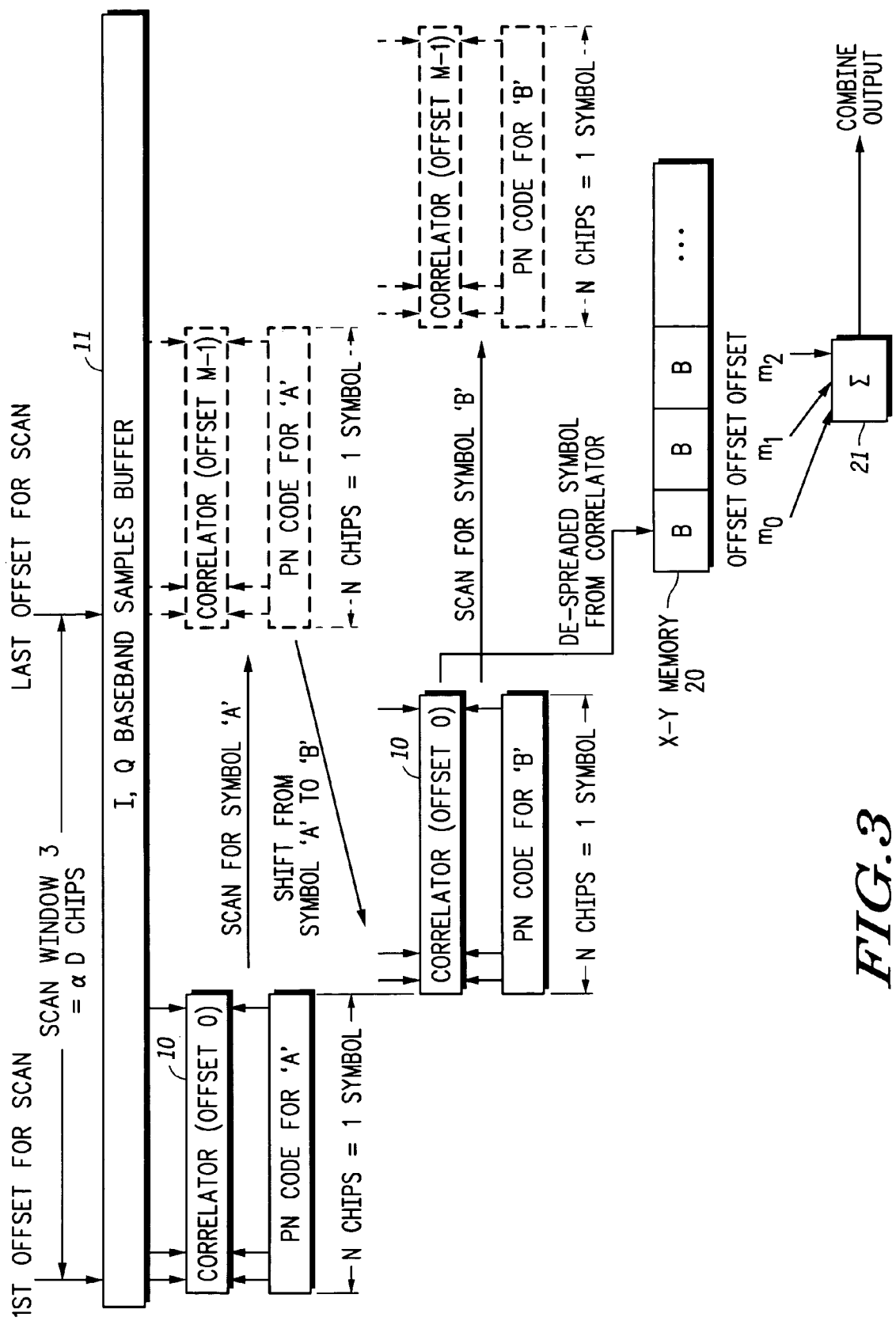
FIG. 3 illustrates, in block diagram format, the basic principles of the X-Y receiver of the present invention, including the scanning procedure, storage bar and combiner.

The present invention is an X-Y, base-band receiver for CDMA. In CDMA, the received signal may be delayed by different reflections between the transmitter and base station. In addition, the transmitted signal may be transmitted by a series of mobile station transmitters at different distances. In the present invention, an X-Y receiver is used at the base station, which may be fixed or mobile. FIG. 1 shows a simple schematic of a transmitter 1 and receiver 2. The transmitter 1 may transmit various symbols A, B, C, etc. In CDMA, each such symbol has a specific pre-identified Pn code. Each symbol transmitted from the transmitter 1 may reach receiver 2 via various rays, $R_0, R_1, \ldots R_{M-1}$.

The present invention uses an X-Y receiver to search for all instances of a specific Pn code. Signals are input into circular buffer 11, in the form of I, Q baseband samples. Referring to FIG. 2, the X-Y receiver continually searches a preselected scan window 3 for all multi-paths for a specific signal, e.g. A. Each instance of A, e.g., $A_0, A_1, A_2$, etc., are placed in a X-Y memory 20. Once the X-Y receiver has completed scanning the scan window 3, the X-Y memory 20 contains all instances of A within the scan window 3. The instances are added together in combiner 21 upon cycle completion. The X-Y receiver obviates the need for the fingers required by the rake receiver. By scanning for all instances of A, all desired multi-paths are accumulated in the X-Y memory 20 and added to enhance the signal to noise ratio.

The locations of each ray are randomly distributed in a limited range, which is equal to the maximum delay for the channel shown in FIG. 2 by the maximum delay window 4. The size of the maximum delay window 4 is directly proportional to the distance between the transmitter 1 and receiver 2. Referring again to FIG. 2, a maximum delay window is defined which is comprised of D "chips," where a chip is the time period in which a Pn code is transmitted. A scan window 3 of length M is defined, where $M=\alpha D$ chips. In the preferred embodiment, $1<\alpha<2$.

The X-Y receiver scans the received signal within the scan window 3 for instances of A, B, C, etc. This may be accomplished by correlating the Pn codes specific to A, for example, to each chip measured. The X-Y receiver continues to scan for instances of A throughout the scan window 3. Each time an instance of A is identified, the information is transmitted to X-Y memory 20. When the entire scan window 3 has been scanned and all instances of A have been saved in the X-Y memory 20, the total signal is accumulated in combiner 21 and stored for later processing.

Still referring to FIG. 2, each offset, $m_o$, $m_1$, $m_2$ ... $M_{M-1}$ will drift back and forth in an apparently random fashion due to the mobile movement of the transmitter and other factors. In addition, the energy strength of each ray will also vary with time due to channel flat fading and other known phenomena. Accordingly, in one embodiment the scan window 3 is modified during operation of the receiver 2 so that all rays continue to be captured. This operation, known as "cluster tracking," will be discussed in greater detail below.

Referring now to FIG. 3, we see I,Q baseband samples in units of chips, which represent the transmitted message. The scan window 3 may be of length $\alpha$ D. The X-Y receiver begins the scanning following the first offset $m_o$, which is dependent upon which symbol is being scanned. For example, the X-Y receiver only scans for B following a time period equivalent to N chips which represents one symbol in the transmitted message. When scanning for A, the correlator 10 begins with offset 0, and continues until the offset equals $M_{M-1}$. Whenever the correlator 10 detects the Pn code for A, that symbol is entered into a X-Y memory 20 for that symbol. The de-spreaded symbol from the correlator 10 is stored in the X-Y memory 20. Following completion of one scan of the scan window for that symbol, the information from the buffer is sent to a combiner 21 where the combined output is transmitted for further processing.

X-Y memory 20 may be a storage bar, and is used to store de-spreaded symbols. The de-spreaded symbol from the $M_{th}$ ray is stored in unit M of the storage bar. There are $M_{eff}$ units in the buffer 20, where $M_{eff}$ is the number of maximum possible available rays and $M_{eff}$ is <=M.

Following a complete cycle, once the X-Y receiver has completely scan the scanned window 3 for a given symbol, e.g., A, then the X-Y receiver begins to scan for symbol B, again storing the de-spreaded symbol in the X-Y memory 20.

Figure 4:
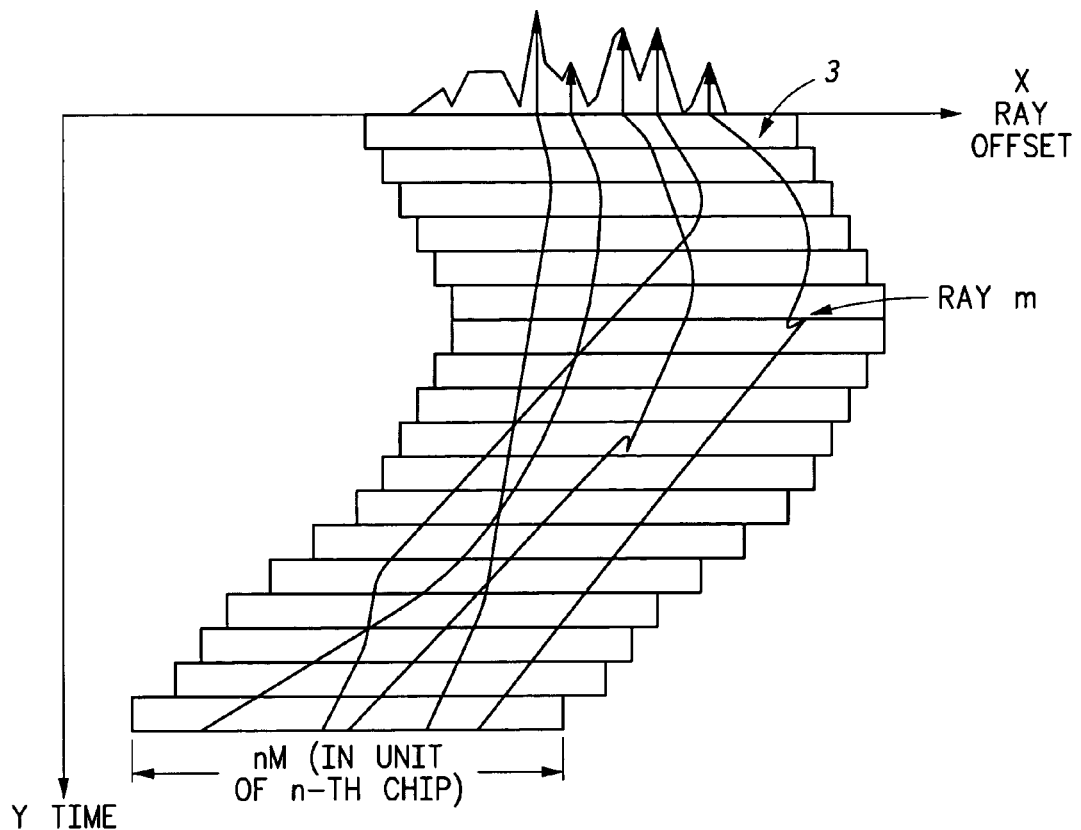
FIG. 4 illustrates, in block format, the basic principles of multi-path locating and cluster tracking.

FIG. 4 shows the basic theory behind multi-path locating and cluster tracking. In FIG. 4, the X-axis represents the ray offset, whereas the Y-axis represents time. The horizontal bars represent the scan window 3 applied by the X-Y receiver during a given time period. As can be seen, in one embodiment of the invention, the scan window 3 may shift along the X-axis to accommodate drift due to the movement of the transmitter. All multi-paths from the same transmitter form a multi-path cluster. The scan window 3 with a size of M=$\alpha$D (in units of chips) can track the cluster drift. To accomplish this, each individual multi-path must be recognized via peak detection algorithms, which are known to those skilled in the art.

Figure 5:
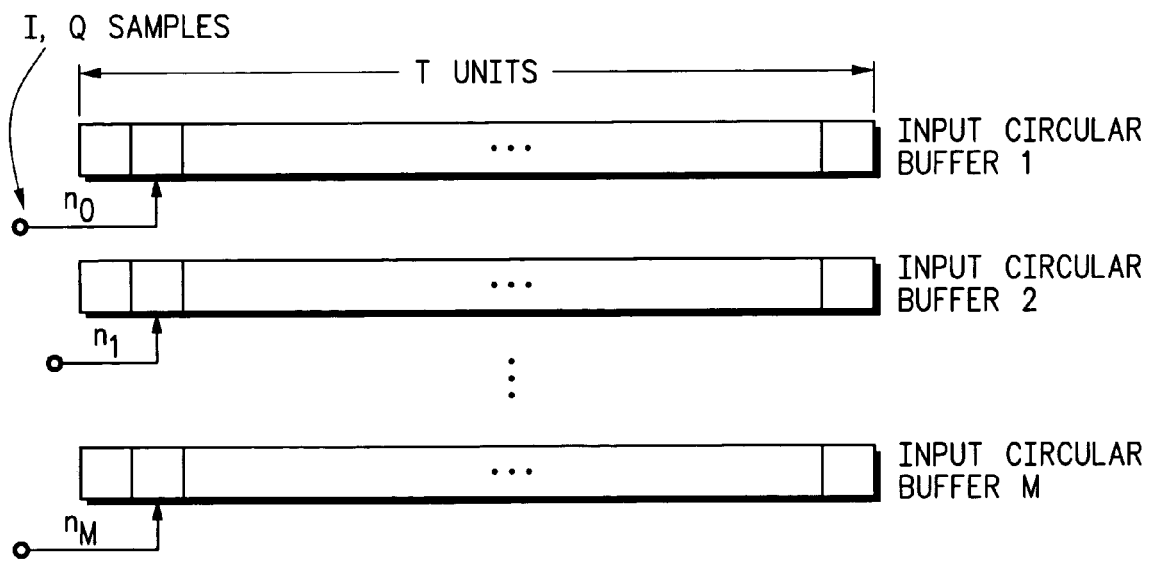
FIG. 5 illustrates, in block format and in greater detail, the operation of the input circular data buffer structure of the X-Y receiver depicted in FIG. 3.

Referring now to FIG. 5, in one embodiment of the invention, multiple samples may be taken on a single chip. For I,Q samples, a plurality of circular buffers may be used to take in n samples per chip from the I,Q inputs. Each of the n circular data buffers 30, 31, 32 will have T units. Number n samples taken from one chip period will be stored in n buffers. The buffers may be implemented as RAM in the base station. N is typically a factor of 2, such as 4, 8, or 16.

Figure 6:
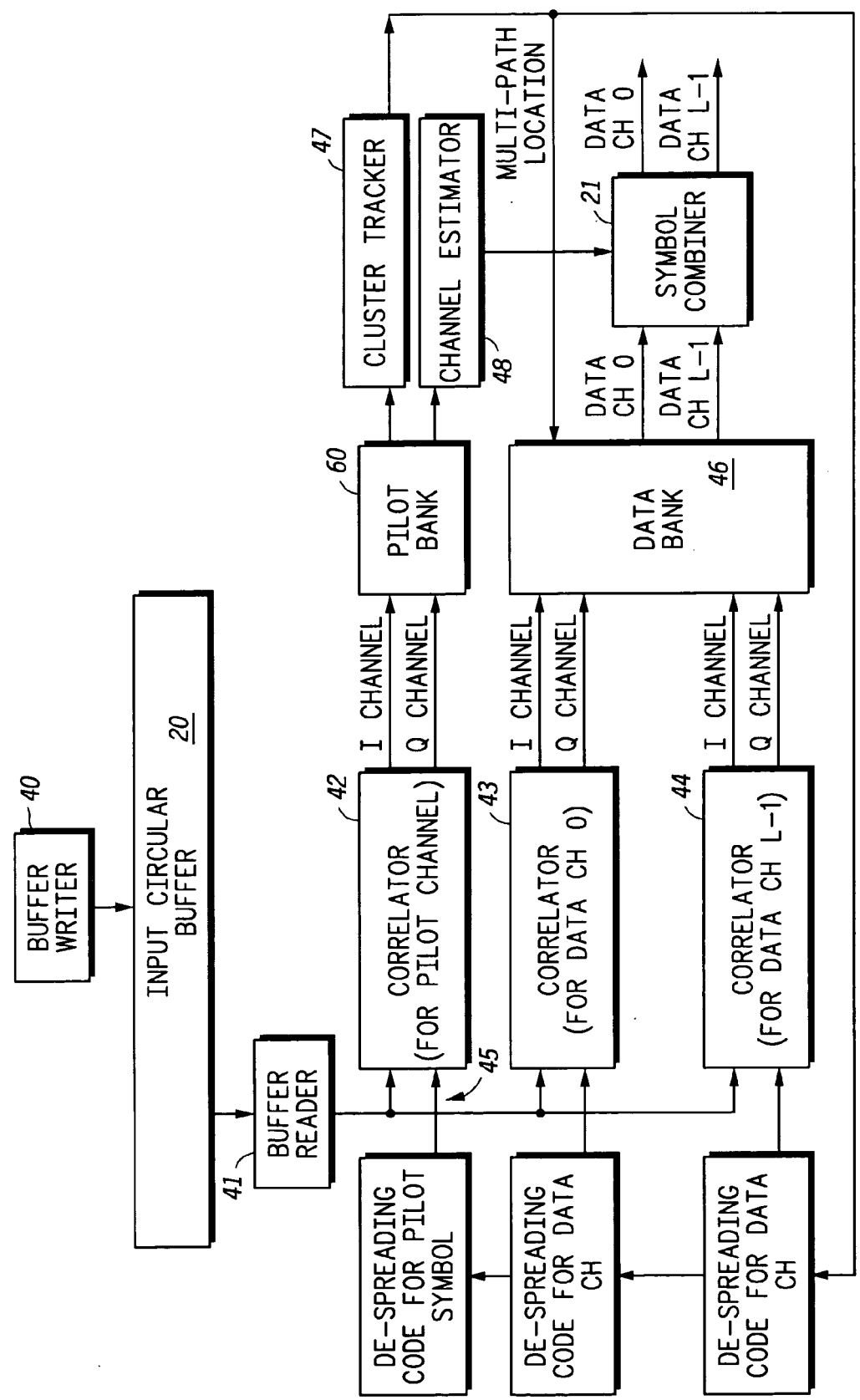
FIG. 6 illustrates, in block format and in greater detail, the operation of correlator bank structure of the X-Y receiver depicted in FIG. 3.

FIG. 6 shows an embodiment of the correlator bank in greater detail. In FIG. 6, the X-Y receiver scans the scan window 3 for instances of a particular channel, either a pilot channel or a data channel 0 to L-1. The buffer writer 40 writes the sample to input circular buffer 20. Buffer 20 is then read by a buffer reader 41, which outputs the sample to the correlator for the associated channel 42, 43, or 44. The correlator 42, 43, or 44 obtains the de-spreading code for the particular symbol via input 60, and outputs the I and Q channel data to the pilot bank 47 in the case of the pilot channel or to the data bank 47 in the case of the data channels. The pilot bank 60 information may be input into the cluster tracker 47 and the channel estimator 48. The feedback of the channel estimator 48 is input into the symbol combiner 21 for the combiner algorithm. The output of the cluster tracker 47 is used to modify the scan window 3 for the various symbols.

The data bank 46 stores information for each multi-path of each data channel from 0 to L-1. That data is then input into the symbol combiner 21 and output for further processing.

Figure 7:
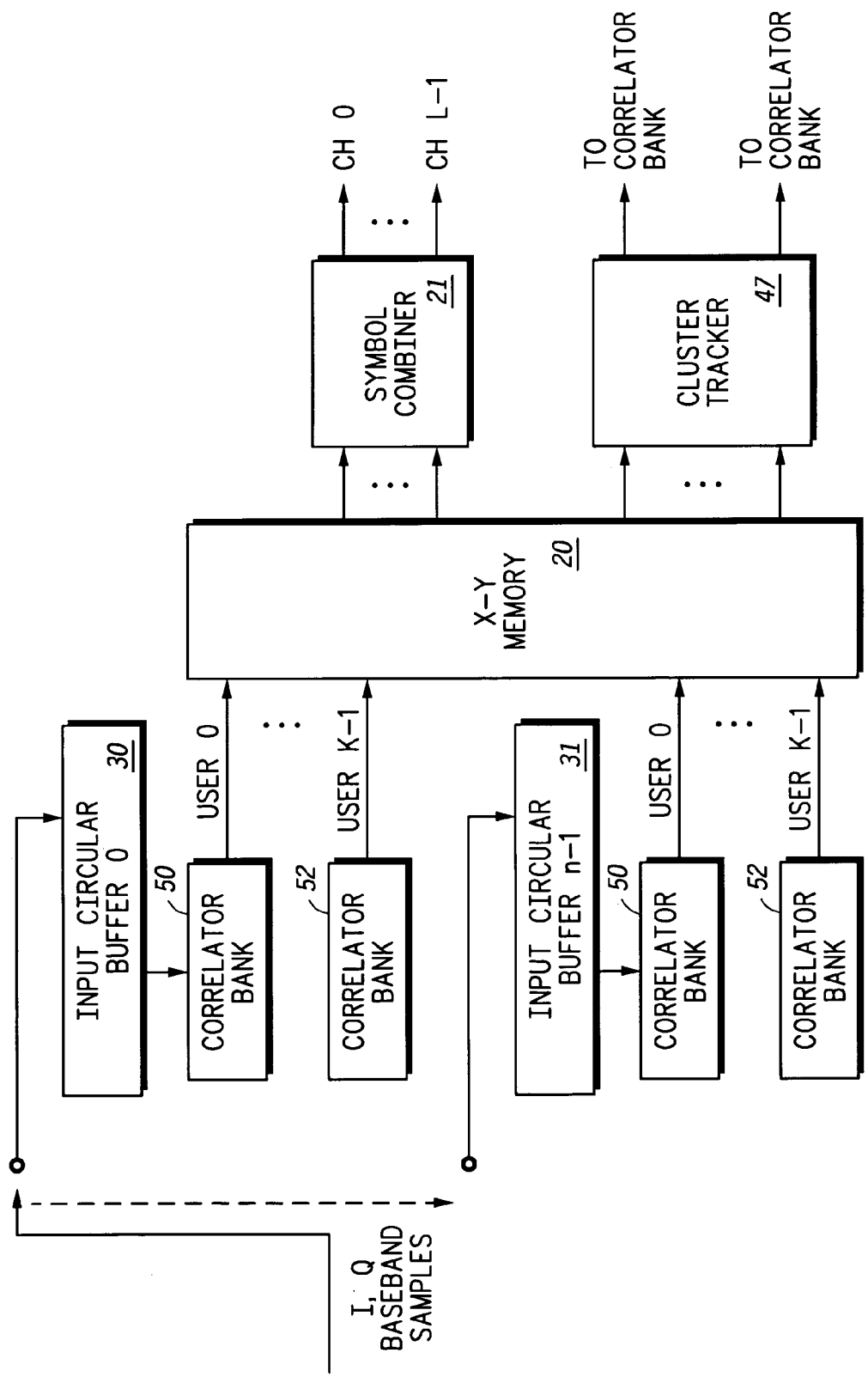
FIG. 7 illustrates, in block diagram format, the X-Y receiver of the present invention configured for multiple users.

FIG. 7 shows a multi-user X-Y receiver structure. For K users, K correlator banks (shown as 50 and 52 in FIG. 7) track the Pn codes assigned to each channel. The number of samples per chip, n, defines the number of input circular buffers (shown as 30 and 32 in FIG. 7). All correlator bank associated with the n-th sample will share the same input circular buffer. One correlator bank corresponds to one user and has one output. The X-Y memory contains K banks, where each bank corresponds to one user. The symbol combiner 21 performs the symbol combining function for each code channel. In one embodiment, there is also a cluster tracker 47 to track each cluster's drift and provide feedback drift information to the correlator bank 50, or 52, for tracking.

In one embodiment, a pilot signal is used by the transmitter 1 and receiving base station 2 to detect multi-paths and associated Pn offsets.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A chip rate base band processor which receives digital information containing symbol information and provides a symbol output, comprising:
    an input memory which stores the digital information;
    a data PN code buffer;
    a pilot PN code buffer;

a pilot multiplier having a first input coupled to the pilot PN code buffer, a second input coupled to the input memory, and a pilot multiplier output;

a data multiplier having a first input coupled to the data PN code buffer, a second input coupled to the input memory, and a data multiplier output;

a pilot correlator having an input coupled to the output of the pilot multiplier, and a pilot correlator output;

a pilot memory coupled to the pilot correlator;

a channel estimator coupled to the pilot memory;

a peak detector coupled to the pilot memory;

a data correlator coupled to the data multiplier;

load controller having a first input coupled to the peak detector, a second input coupled to data correlator, and a load controller output;

a data memory coupled to the load controller;

a phase rotator having a first input coupled to the channel estimator, a second input coupled to the data memory, and a phase rotator output; and a symbol combiner having an input coupled to the phase rotator, and an output which provides the symbol output.

2. The chip rate base band processor of claim 1 further comprising a cluster tracker having an input coupled to the pilot memory, and an output of the cluster tracker coupled to the pilot PN code buffer.

3. The chip rate base band processor of claim 1 wherein the output of the cluster tracker is coupled to the data PN code buffer.

* * * * *